(12) United States Patent
Demuth

(10) Patent No.: US 10,306,342 B2
(45) Date of Patent: May 28, 2019

(54) TRANSMISSION OF DATA FROM WIND TURBINES AND WIND FARMS TO A CONTROL CENTER

(71) Applicant: WOBBEN PROPERTIES GMBH, Aurich (DE)

(72) Inventor: Simon Demuth, Hage (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 15/754,577

(22) PCT Filed: Jun. 21, 2016

(86) PCT No.: PCT/EP2016/064263
§ 371 (c)(1),
(2) Date: Feb. 22, 2018

(87) PCT Pub. No.: WO2017/032478
PCT Pub. Date: Mar. 2, 2017

(65) Prior Publication Data
US 2018/0242057 A1    Aug. 23, 2018

(30) Foreign Application Priority Data

Aug. 26, 2015   (DE) .................. 10 2015 114 174

(51) Int. Cl.
*G08B 21/00* (2006.01)
*H04Q 9/02* (2006.01)
(Continued)

(52) U.S. Cl.
CPC .............. *H04Q 9/02* (2013.01); *F03D 7/047* (2013.01); *H04L 41/0681* (2013.01);
(Continued)

(58) Field of Classification Search
CPC .. H04Q 9/02; H04Q 2209/10; H04Q 2209/30; H04Q 2209/75; F03D 7/047;
(Continued)

(56) References Cited

U.S. PATENT DOCUMENTS 8,568,099 B2    10/2013  Sabannavar et al.
9,453,497 B2 *   9/2016  Ubben ...................... F03D 7/00
(Continued)

OTHER PUBLICATIONS

Padhye et al., "A TCP-Friendly Rate Adjustment Protocol for Continuous Media Flows over Best Effort Networks," 1999, 2 pages.
(Continued)

*Primary Examiner* — Zhen Y Wu
(74) *Attorney, Agent, or Firm* — Seed IP Law Group LLP

(57) ABSTRACT

A method for transmitting data records of a plurality of wind turbines or and a plurality of windfarms to a control center as well as a wind turbine, control center and a system configured to perform the method are disclosed. The method includes dispatching a notification of an updated data record from one of the wind turbines or windfarms to the control center. A decision is then made in the control center as to whether the updated data record is to be requested. A request for the updated data record is dispatched from the control center to the wind turbine or windfarm only if the updated data record is to be requested. The request is received in the windfarm or wind turbine and a reply with the updated data record reply is sent to the control center.

16 Claims, 3 Drawing Sheets

(51) Int. Cl.
  *F03D 7/04* (2006.01)
  *H04L 29/08* (2006.01)
  *H04L 29/06* (2006.01)
  *H04L 12/24* (2006.01)
  *H04L 12/26* (2006.01)

(52) U.S. Cl.
  CPC .......... *H04L 43/0864* (2013.01); *H04L 67/02* (2013.01); *H04L 67/32* (2013.01); *H04L 69/28* (2013.01); *F03D 7/048* (2013.01); *H04L 67/322* (2013.01); *H04L 67/325* (2013.01); *H04Q 2209/10* (2013.01); *H04Q 2209/30* (2013.01); *H04Q 2209/75* (2013.01); *Y02E 10/723* (2013.01)

(58) Field of Classification Search
  CPC . F03D 7/048; H04L 41/0681; H04L 43/0864; H04L 67/02; H04L 67/32; H04L 69/28; H04L 67/322; H04L 67/325; Y02E 10/723
  USPC ..................................... 340/870.16
  See application file for complete search history.

(56) References Cited

U.S. PATENT DOCUMENTS

| | | | |
|---|---|---|---|
| 9,603,316 B1* | 3/2017 | Mansey | A01G 22/00 |
| 2003/0174162 A1 | 9/2003 | Wu | |
| 2004/0249590 A1* | 12/2004 | Ota | G01D 9/005 |
| | | | 702/79 |
| 2007/0255832 A1* | 11/2007 | Riesberg | H04L 61/2015 |
| | | | 709/226 |
| 2008/0079569 A1* | 4/2008 | Axelsen | G06Q 10/02 |
| | | | 340/541 |
| 2009/0010233 A1 | 1/2009 | Pratt, Jr. et al. | |
| 2011/0011110 A1* | 1/2011 | Hanson | H05K 7/20836 |
| | | | 62/259.2 |
| 2011/0138177 A1* | 6/2011 | Qiu | H04L 9/006 |
| | | | 713/168 |
| 2013/0067013 A1* | 3/2013 | Dgani | H04L 29/06 |
| | | | 709/206 |
| 2014/0228976 A1* | 8/2014 | K. S. | G05B 19/0428 |
| | | | 700/9 |
| 2015/0118993 A1* | 4/2015 | Rune | H04W 12/08 |
| | | | 455/410 |
| 2015/0254026 A1* | 9/2015 | Kobayashi | G06F 3/1204 |
| | | | 358/1.13 |
| 2015/0379854 A1* | 12/2015 | Kors | G08B 21/182 |
| | | | 340/618 |
| 2016/0183791 A1* | 6/2016 | Chen | H04Q 9/00 |
| | | | 340/870.07 |
| 2017/0017214 A1* | 1/2017 | O'Keeffe | G05B 15/02 |
| 2017/0096986 A1* | 4/2017 | Takeuchi | F03D 17/00 |
| 2017/0363065 A1* | 12/2017 | Jakobs | F03D 7/047 |

OTHER PUBLICATIONS

Padhye et al., "A TCP-Friendly Rate Adjustment Protocol for Continuous Media Flows over Best Effort Networks CMPSCI Technical Report TR 98-047", Oct. 23, 1998, 22 pages.

\* cited by examiner

TRANSMISSION OF DATA FROM WIND TURBINES AND WIND FARMS TO A CONTROL CENTER

BACKGROUND

Technical Field

The invention relates to data transmissions between wind turbines and/or windfarms and a control center. The invention furthermore relates to a wind turbine or windfarm, a control center, and a system consisting of a plurality of wind turbines or windfarms with a single control center to carry out the method.

Description of the Related Art

Wind turbines have a multiplicity of sensors which serve to support the control or adjustment of the wind turbines during operation. These sensors, furthermore, serve to record historical data which are used during maintenance operations or during service intervals for determining the condition of the wind turbines. Moreover, the sensor data serve to represent the current operating condition of a wind turbine.

Along with the turbine-specific data, such as performance and status data, the sensors also record environmental data such as, for example, wind speed and wind direction, which serve, on the one hand, to control and adjust the wind turbine, but, on the other hand, are also of interest as data for weather services, for example to record weather history or to determine the weather forecast.

Some wind turbines are, therefore, already equipped with a remote interrogation facility which enables the data recorded by sensors of the wind turbine to be retrieved at a remote location, for example via a modem link. Furthermore, wind turbines are known in which sensor data selected at a specific time of day can be transmitted to a remote location, for example, an operator, by means of the modem link. Said operator is thus provided with an overview of the operating history of its wind turbine.

However, methods of this type have the disadvantage that only historical data, for example for the previous day, are transmitted and current data are not directly or readily available. However, current data in particular are very important for use by service personnel, e.g., if measured values differ from the normal values, so that, for example, immediate action can be taken in respect of the operation of the wind turbine.

Moreover, current sensor data of the wind turbines, such as, e.g., weather data, are also helpful in order to implement the most intelligent possible control of the grid, i.e., for example, of the generators of electrical energy in the grid.

However, if the sensor data of all wind turbines are to be continuously evaluated, this would result in an overload of the evaluating equipment and the data lines which provide only a limited bandwidth.

BRIEF SUMMARY

Data from sensors of a multiplicity of wind turbines and/or windfarms is made available for further use. The most up-to-date possible data is received from the wind turbines while taking into account that the data line bandwidth made available is not exceeded due to the volume of data.

The German Patent and Trademark Office has identified the following prior art in the priority application for the present application: US 2009/0010233 A1, U.S. Pat. No. 8,568,099 B2, Padhye, Jitendra: "A TCP-friendly rate adjustment protocol for continuous media flows over best effort networks", and Padhye, Jitendra: "A TCP-Friendly Rate Adjustment Protocol for Continuous Media Flows over Best Effort Networks CMPSCI Technical Report TR 98-047". A method for transmitting data records from a plurality of wind turbines and/or a plurality of windfarms to a control center is provided. For this purpose, the method comprises the following steps.

A notification of the existence of an updated data record is first sent from one of the wind turbines or wind farms to the control center. The control center then decides whether the updated data record is to be requested. If the updated data record is to be requested, a request for the updated data record is sent from the control center to the wind turbine or windfarm which previously transmitted the notification of the updated data record to the control center. The request is then received by the wind turbine and a reply with the updated data record is sent to the control center.

The control center thus collects all sensor data of the connected wind turbines which users, service personnel or other authorized persons can then access, e.g., by dialing in with a PC via the Internet.

A control center, which can also be referred to as a control station or measuring station, is a technical device, in particular a computer, for retrieving and collecting the measured values or data records. The control center or control station is configured to store, process or forward the measured values or data records. The control station furthermore offers interfaces in order to be able to display or retrieve the measured values or processed measured values. Further, terminal devices can be connected to the control center via data lines for displaying and for retrieving the measured values or data records.

Accordingly, whenever an updated data record of a wind turbine or windfarm is available, a notification is therefore sent to the control center in order to inform the control center of the existence of this updated data record.

A data record comprises, in particular, an individual measured value of a sensor of a wind turbine or windfarm, a plurality of measured values of a plurality of sensors of a wind turbine or windfarm, or a plurality of measured values from a plurality of sensors of a plurality of wind turbines of a windfarm. Accordingly, a data record of a windfarm comprises, for example, a plurality of temperature values which are measured in the area of the generators of all wind turbines of a windfarm.

Thus, for example, if a data record comprises only a single measured value and a sensor signals a new measured value, a notification of an updated data record is dispatched to the control center. If a plurality of measured values are combined in one data record, the notification of an updated data record is, for example, not dispatched until all sensors have signaled new measured values for this data record or at least a predefined number of new measured values of the data record is present. However, it is also possible that a notification of an updated data record is already dispatched if a plurality of measured values are combined in one data record and only a single new measured value is signaled by a sensor for the data record.

Accordingly, this notification of an updated data record corresponds only to an indication that updated data are available. Measurement data or sensor data themselves are not yet transmitted with this notification. The notification therefore essentially only contains information identifying the wind turbine or windfarm from which an updated data record is present and the measurement data which the data record contains.

In the next step, the control center then decides whether the updated data record which is now available from a specific wind turbine or windfarm is to be requested at the current time. If the control center decides that the updated data record is to be requested, the control center sends a request for this data record to the corresponding wind turbine or windfarm.

With this method, it is thus possible for the control center to request updated measured values of a wind turbine or windfarm immediately after they are available for further use. However, the control center can simultaneously decide whether these data are required at all at the current time or whether a request for the data merely represents a superfluous loading of the data lines and would therefore result in a limitation of the bandwidth for higher-priority data.

According to a first embodiment, a check is carried out when a decision is made in the control center as to whether the updated data packet is to be requested in order to ascertain whether a time interval which is assigned to the wind turbine or windfarm from which the notification of an updated data record originates has elapsed since the last dispatch of a request for an updated data record or since the reception of the last reply with a data record from this wind turbine or windfarm.

If the time interval has elapsed, the updated data record is requested by dispatching the request. If the time interval has not yet elapsed, the notification of the updated data record is ignored.

Accordingly, a time interval is therefore stored in the control center for each wind turbine and/or each windfarm which is connectable to the control center by means of a data connection. Accordingly, this time interval advantageously serves to allow the control center to decide whether the updated data are to be requested or not.

It is therefore guaranteed, even if updated measured values of a wind turbine or windfarm are available very frequently or in a large number, that these measured values are retrieved only on a data record by data record basis with a maximum frequency derived from the time interval of the wind turbine or windfarm.

According to a further embodiment, a time interval is assigned to each wind turbine and/or each windfarm which is connectable by means of a data connection. This time interval is variable according to this embodiment. An instrument is provided by means of a variable time interval to enable a prioritization of the updated data records of different wind turbines or wind farms.

According to a further embodiment, each time interval, i.e., the duration of the time interval, is automatically adjusted by the control center and/or the time interval is manually adjusted.

Accordingly, the time interval can be automatically adjusted, where a wide variety of program sequences or mechanisms can be taken into account in the control center for this purpose. Furthermore, a user can also manually adjust the time intervals and, thus, the prioritization.

According to a further embodiment, the time interval of a wind turbine or windfarm comprises a default duration in a default operating mode, which can also be referred to as no-load operating mode. This default duration is shortened by changing over from the default operating mode to an access operating mode if a user requests data from the wind turbine or windfarm. The time interval is shortened here, for example to a predefined minimum value, i.e., a minimum time duration, by the requesting of data by a user.

The data which were transmitted to the control center in the last update(s) are therefore already available to a user when accessing a wind turbine. However, due to the shortening of the time interval, the user is informed constantly or at least as promptly as possible of updated data of the relevant wind turbine or windfarm as from the time of access.

According to a further embodiment, a notification of an updated data record and a reply with the updated data record are dispatched by means of a computer which is assigned in each case to a wind turbine or windfarm or forms part thereof. In particular, this computer also forms part of a Supervisory Control and Data Acquisition System, referred to as a SCADA system for short.

Accordingly, a computer which is connectable, for example, via a bus system to the wind turbine(s) is therefore provided for one or more wind turbines. The sensor data of the wind turbine or wind turbines are transferred accordingly to the computer of the wind turbine or wind turbines of a windfarm by means of the connection between the wind turbine or wind turbines and the computer. The computer thus forms part of a wind turbine or windfarm.

The computer is, furthermore, configured to detect when new measured data or sensor data are present which, for example, differ from the preceding values. The computer of the wind turbine or windfarm then sends the notification of an updated data record to the control center by means of a data connection which is, for example, a TCP/IP connection.

According to a further embodiment, the computer processes incoming requests from the control center serially, i.e., in the order of their reception. This processing is also referred to as "FIFO", i.e., "First In First Out". Furthermore, the round-trip delay or signal transit time between the control center and each of the computers of the wind turbines and/or windfarms is determined according to this embodiment.

For this purpose, repeated cycles are performed in each case in the control center with a predefined frequency for each computer in order to determine the round-trip delay or signal delay or signal transit time. In each cycle, a predefined data packet is sent from the control center to the corresponding computer, where, due to the serial processing of requests, the computer processes the data packet after previously received data packets have been processed.

After the processing or during the processing of the predefined data packet for determining the round-trip delay or signal transit time, the computer then sends a reply to the control center. The time period between the dispatch of the data packet and the reception of the reply to the data packet is then determined in the control center and the duration of the time interval is adjusted, i.e., is left unchanged, shortened or lengthened, depending on the measured time period.

Accordingly, on the one hand, the quality of the connection lines between the control center and a computer, and, on the other hand, the utilization of the computer itself is determined. The time interval is then adjusted depending on both of these factors, so that in turn neither the bandwidth of the data connection nor the processing capacity of the computer are overused.

The last-mentioned embodiment prevents continued requesting of data from computer of a wind turbine or windfarm, even though previously dispatched requests have still not been answered at all. The data transferred to the control center would in fact no longer be up-to-date beyond a specific overload point as a result of an accumulation of unanswered requests.

According to a further embodiment, in order to adjust the time interval of one of the wind turbines or wind parks, the difference between the requests dispatched to this wind turbine or windfarm, in particular the computer of the wind turbine or windfarm, and the number of responses received from the wind turbines or windfarm is determined in the control center. This difference thus corresponds to the as yet unanswered requests for updated data records. The time interval is then adjusted, i.e., is left unchanged, shortened or lengthened, on the basis of this difference.

The speed of response to data requests is thus determined alternatively or in addition to the determination of the round-trip delay or signal transit time described in the previous embodiment. Accordingly, a utilization of the computers and the connection lines between the computers and the control center can also be taken into account by the method specified in the last embodiment, so that an overload can be counteracted by lengthening the time interval and, by shortening the time intervals, the presence of the most up-to-date possible data in the control center is again guaranteed.

According to a further embodiment, repeated cycles are performed in each case in the control center for each computer in order to determine the differences. A cycle of this type for determining the differences is in each case performed repeatedly for the wind turbines or windfarms, either whenever a notification of an updated data record is received, or with a predefined frequency. The time interval is thus regularly adjusted.

According to a further embodiment, in each cycle in which the difference is determined for one of the wind turbines or windfarms, the time period of the wind turbine or windfarm is adjusted according to the determined difference.

For this purpose, the difference, once it has been determined, is compared with an upper and with a lower threshold value. If the upper threshold value is reached or exceeded, the time interval is lengthened by a predefined step width, and if the lower threshold value is reached or understepped, the time interval is shortened by a predefined step width. A stepwise adjustment of the time interval is thus possible.

According to a further embodiment, a check is additionally carried out in each cycle in which the difference is determined in order to establish whether the time interval corresponds to a predefined maximum value, i.e., a maximum time period, or even exceeds said time period. If the maximum value is reached or exceeded, a warning signal is emitted by the control center. This warning signal is, for example, emitted directly to service personnel who can perform a check on the data line to the wind turbine or windfarm and/or on the computer of the wind turbine or windfarm on the basis of the warning signal.

Provided is at least one wind turbine or windfarm for implementing an embodiment of the aforementioned method. Provided is a control center and a system with a plurality of wind turbines and/or windfarms for implementing an embodiment of the method.

BRIEF DESCRIPTION OF THE SEVERAL VIEWS OF THE DRAWINGS

Further embodiments are explained with reference to the drawings of example embodiments described in detail. In the drawings.

DETAILED DESCRIPTION

Figure 1:
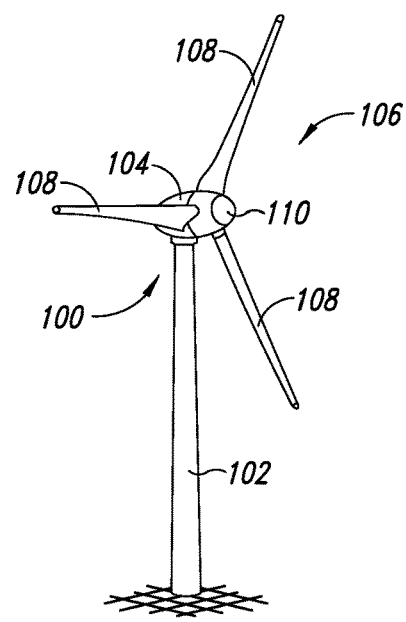
FIG. 1 shows a wind turbine.

FIG. 1 shows a schematic representation of a wind turbine according to the invention. The wind turbine 100 has a tower 102 and a nacelle 104 on the tower 102. An aerodynamic rotor 106 with three rotor blades 108 and a spinner 110 is provided on the nacelle 104. During the operation of the wind turbine, the aerodynamic rotor 106 is set in rotational motion by the wind and therefore also rotates a rotor or winding of a generator which is directly or indirectly coupled to the aerodynamic rotor 106. The electrical generator is disposed in the nacelle 104 and generates electrical energy. The pitch angles of the rotor blades 108 can be modified by pitch motors on the rotor blade roots of the respective rotor blades 108.

Figure 2:
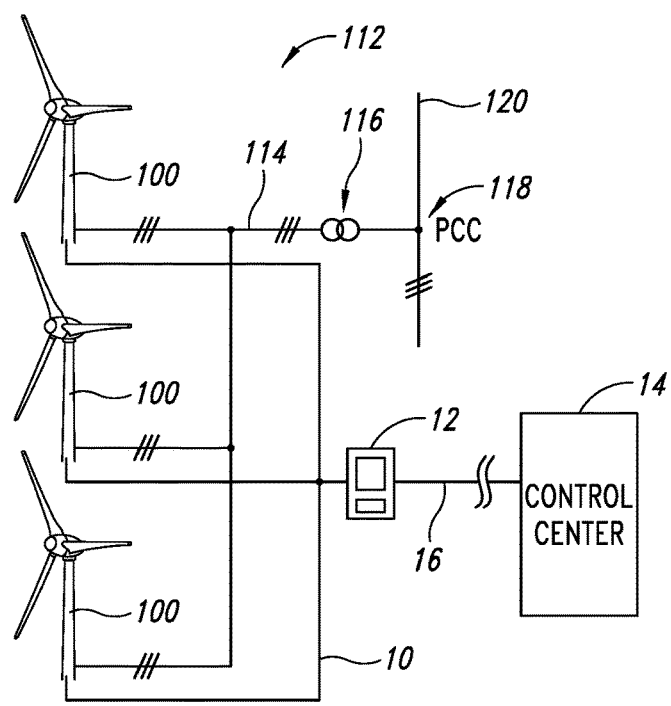
FIG. 2 shows a windfarm with a computer which is connected to a control center.

FIG. 2 shows a windfarm 112 with, by way of example, three wind turbines 100, which may be identical or different. The three wind turbines 100 thus essentially represent any number of wind turbines of a windfarm 112. The wind turbines 100 provide their power, i.e., in particular, the generated current, via an electric windfarm grid 114. The currents or powers of the individual wind turbines 100 generated in each case are added together and a transformer 116 is usually provided to step up the voltage in the windfarm and then feed it at the feed-in point 118, which is also generally referred to as the PCC, into the supply grid 120. FIG. 2 is only a simplified representation of a windfarm 112, which, for example, shows no control, although a control is present. The windfarm grid 114 may, for example, also be designed differently in that, for example, a transformer is also present at the output of each wind turbine 100, to name but one different example embodiment.

FIG. 2 furthermore shows a computer 12, which is also referred to as a SCADA computer and is connected via a bus system 10 to each individual wind turbine 100. FIG. 2 furthermore shows a control center 14, wherein the control center 14 and the computer 12 are interconnected via a connection 16. The connection 16 corresponds, for example, to a TCP/IP connection.

In FIG. 2, only a single windfarm 12 is connected by way of example to the control center 14. A plurality of windfarms 112, in each case with a plurality of wind turbines 100, are actually connected to the control center 14. FIG. 2 furthermore shows three wind turbines 100 which are connected to a computer 12. Along with the windfarm 112, individual wind turbines 100 are also conceivable, in each case having their own computer 12 which is in turn connected via a connection 16 to the control center 14. The connection 16 between the computer 12 and the control center 14 is shown here as relatively very short, but may actually be several hundred or even thousand kilometers long.

The connection 16 is furthermore shown as a direct connection between the computer 12 and the control center 14, wherein a multiplicity of further electronic components from the message transfer or data transfer domain are interposed in a real transmission line. The connection 16 is shown here as a line, wherein this representation is also an example and a connection 16 may also comprise radio links.

Figure 3:
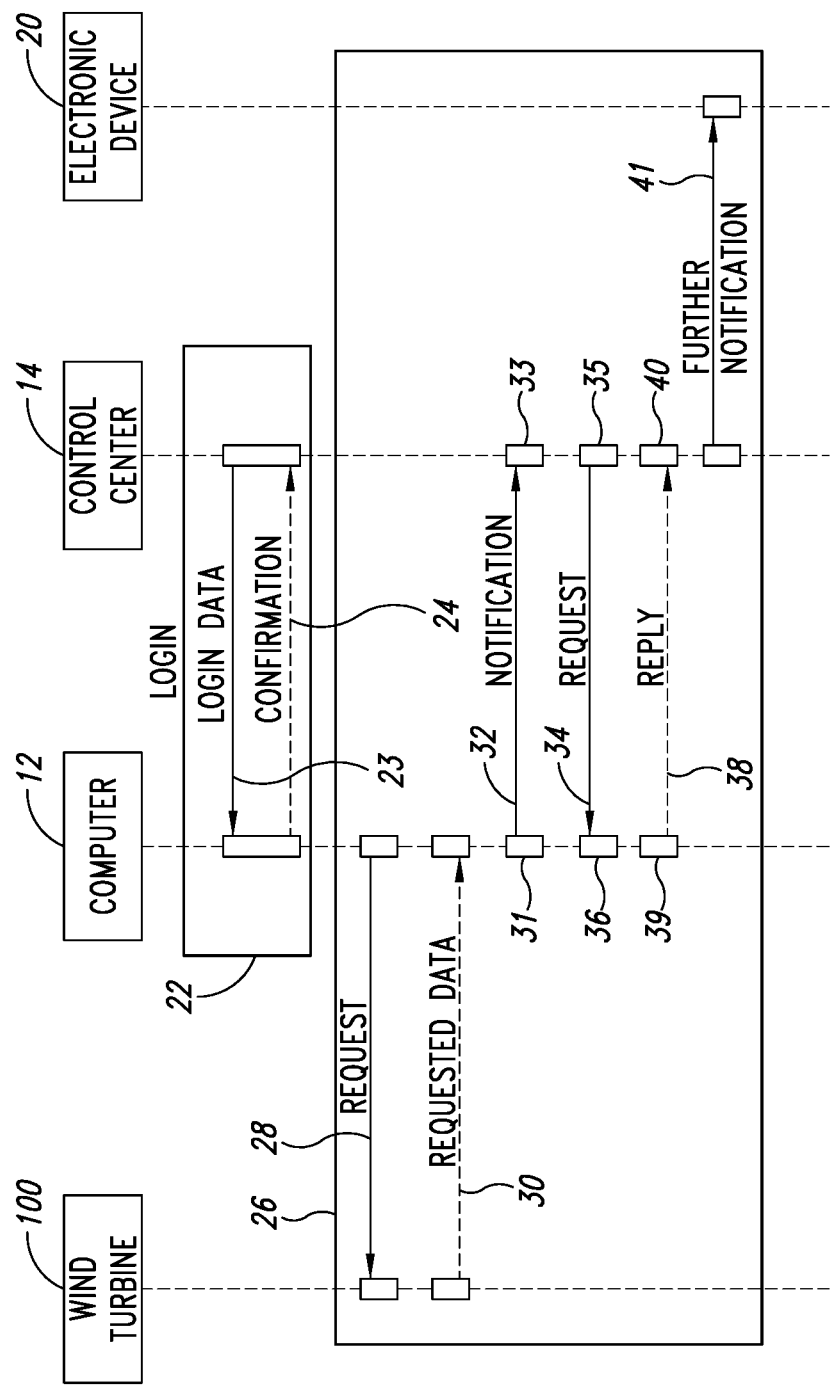
FIG. 3 shows a schematic flow diagram of an example embodiment of the transmission method.

FIG. 3 shows an example embodiment of a transmission of data from a wind turbine 100 through to an electronic device 20 of a user, with which the user, for example a person responsible for maintenance, can display the sensor data.

A computer 12 of the wind turbine 100, which is disposed in the area of the wind turbine, i.e., either directly in the tower of the wind turbine 100 or within a radius of a few meters to several kilometers around the wind turbine 100, e.g., in a windfarm node point, is disposed between the sensors (not shown) of the wind turbine 100 and the electronic device 20. The computer 12 is connected to the control center 14, which is in turn connected to the electronic device 20.

In a login step 22, the control center logs into the computer 12 of the wind turbine 100. If login data 23 were able to be verified in the computer 12, a confirmation 24 of the login is sent to the control center 14.

A data connection between the computer and the control center which is maintained continuously within a loop 26 is then configured. Within this loop 26, the computer 12 requests 28 new sensor data continuously, e.g., timed with a predefined frequency, from the wind turbine 100. In response, the wind turbine 100 sends the requested data 30 to the computer 12. If these data from the wind turbine 100 differ from the preceding received data from the same sensor, the computer 12 signals that an updated data record is present from the wind turbine 100 by dispatching 31 a notification 32 to the control center 14.

This notification 32 is sent 31 to the control center 14 and is received 33 by the latter. The control center 14 then decides whether the updated data record is to be requested. If the data record is to be requested, a request 34 is dispatched 35 from the control center 14 to the computer 12 and, following the reception 36 of the request 34, a reply 38 with the updated data record is dispatched 39 from the computer 12 of the wind turbine 100 to the control center 14. The updated data record is then received 40 by the control center 14 and can now be forwarded to an electronic device 20 by means of a further notification 41.

Whenever the computer 12 receives new data 30 from the wind turbine, a notification 32 is dispatched 31 accordingly via an updated data record. The further steps or data transmission steps 31 to 35 shown in FIG. 3 are carried out only if the control center 14 decides that the updated data record is to be requested.

In order to then decide in the control center 14 whether the updated data are to be requested or said data are not to be requested, a time interval is predefined for each wind turbine 100 or windfarm 112. On reception 33 of the notification 32 of an updated data record, a check is carried out in the control center with the time interval to establish whether the time interval since the last reception 40 of an updated data record has already elapsed. If the time interval has elapsed, the new updated data record is requested 35, and otherwise the notification 32 of an updated data record is ignored.

Figure 4:
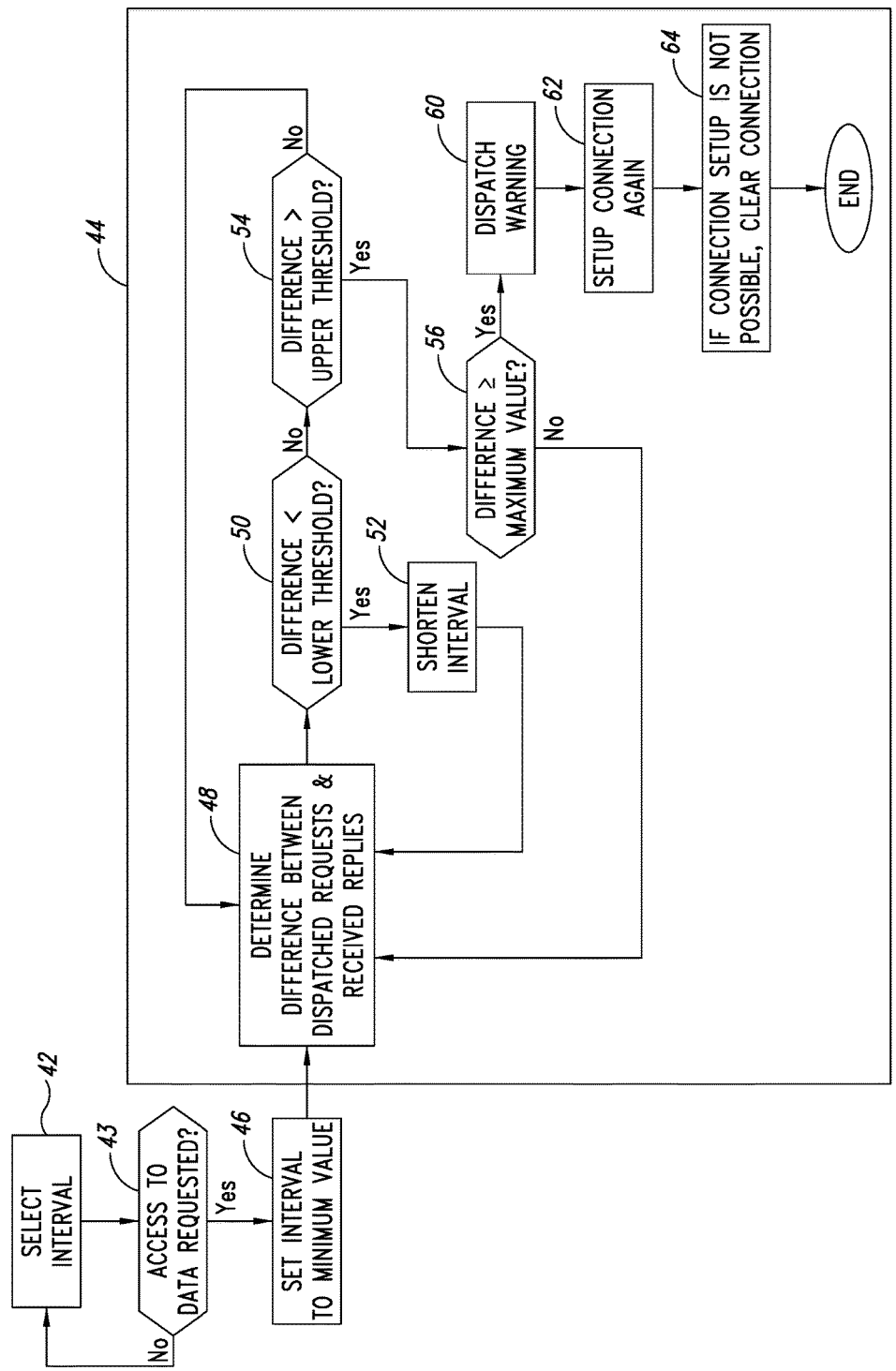
FIG. 4 shows a sequence of an example embodiment for adjusting time intervals.

The time interval for each wind turbine 100 or windfarm 112 is varied in the control center 14, as shown in FIG. 4 below.

FIG. 4 now shows a variation or adjustment of the time interval of a wind turbine. As already explained, the time interval which is adjusted is used by the control center 14 to decide whether updated data are to be requested from the wind turbine 100 or windfarm 112 to which the time interval is assigned.

The time interval is selected in the condition 42 so that it corresponds to a predefined default duration. This default duration of the time interval is retained until access to the data of the wind turbine 100 or windfarm 112 to which the time interval considered here is assigned is requested, e.g., by a user, in step 43.

If data are requested, a loop 44 is repeated, e.g., at a predefined frequency, until no further access is required. The default condition 42 is then selected once more with the default time period or default duration.

Before the loop 44 is executed for the first time, the time interval is set to a minimum value in a step 46. In the next step 48, the step of the loop 44, the difference between the requests 34 currently dispatched by the computer 12 of the wind turbine 100 or windfarm 112 and the received replies 38 to these requests is then determined. The number of as yet unanswered requests 34 corresponding to this difference is therefore determined.

The difference is then first compared 50 with a lower threshold value and if the lower threshold value is understepped, the time interval is shortened in a step 52. The difference is then determined once more in step 48. The difference is reduced in step 52 for as long as the lower threshold value is understepped. If the lower threshold value is no longer understepped, the difference is compared 54 with an upper threshold value and if this upper threshold value is not exceeded, the difference is determined once more and the comparisons 50 and 54 are repeated.

If the comparison 54 of the difference with the upper threshold value reveals that the upper threshold value is exceeded, a check is carried out in a step 56 to establish whether the interval duration has reached or exceeded a maximum value. If the maximum value is not exceeded, the difference is determined once more in step 48.

If a maximum time interval duration, i.e., a maximum duration of the time interval, is reached, a warning is dispatched 60. Following the dispatch 60 of the warning, the connection to the wind turbine, i.e., to the computer 12 of the wind turbine 100, for example, is again set up 62, and if a new connection set-up is not possible, the connection is completely cleared down 64.

The volume of data transmitted between computers 12 and the control center 14 is controlled in such a way that an overloading of the data lines is avoided.

The invention claimed is:

1. A method for transmitting data records of a plurality of wind turbines or windfarms to a control center, comprising:
    dispatching a notification of an updated data record from a wind turbine or windfarm of the plurality of wind turbines or windfarms to the control center,
    determining, at the control center, whether the updated data record is to be requested, determining whether the updated data record is to be requested includes determining whether a particular time interval assigned to the wind turbine or windfarm has elapsed since a last dispatch of a request or a reception of a last reply including a last data record,
    if the time interval has not yet elapsed, ignoring the notification of the updated data record, and
    if the time interval has elapsed:
        dispatching, from the control center, a request for the updated data record of the wind turbine or windfarm,
        receiving the request for the updated data record by the wind turbine or windfarm, and
        dispatching a reply with the updated data record from the wind turbine or windfarm to the control center.

2. The method according to claim 1, comprising:
    assigning a time interval to each wind turbine or each windfarm of the plurality of wind turbines or windfarms, the wind turbine or windfarm being connected to the control center using a connection.

3. The method according to claim 1, comprising:
automatically adjusting, at the control center, a duration of the time interval.

4. The method according to claim 3, comprising:
setting the time interval, in a default condition, to a default duration, and
shortening or adjusting the time interval to a predefined minimum period in response to a user requesting at least one data record from the wind turbine or windfarm.

5. The method according to claim 1, wherein dispatching the notification of the updated data record and dispatching the reply are performed by a computer assigned to the wind turbine or windfarm.

6. The method according to claim 5, comprising:
serially processing, by the computer, received requests, and
determining, at the control center, a round-trip delay or signal transit time between the control center and the computer, wherein the determination is cyclically repeated with a predefined frequency by at least:
sending a predefined data packet from the control center to the computer, wherein the computer processes the data packet after previously received data packets have been processed and dispatches a reply to the control center during or after the processing,
determining, at the control center, a time period between the sending of the data packet and receiving the reply, and
adjusting a duration of the time interval in each cycle based on the determined time period.

7. The method according to claim 1, comprising:
adjusting the time interval assigned to the wind turbine or windfarm by at least:
determining, at the control center, a difference between a number of dispatched requests and a number of received replies, the difference representing a number of replies not yet received, and
adjusting the time interval based on the difference between the number of dispatched requests and the number of received replies.

8. The method according to claim 7, comprising:
determining the difference in each cycle of a plurality of cycles that are repeated with a predefined frequency or determining the difference in response to receiving the notification of the updated data record is received.

9. The method according to claim 8, comprising:
adjusting the time interval in each cycle,
after the difference is determined, comparing the difference with an upper threshold value and a lower threshold value,
if the difference meets the upper threshold value or is greater than the upper threshold value, lengthening the time interval by a predefined step width, and
if the difference reaches the lower threshold value or is lower than the lower threshold value, shortening the time interval by the predefined step width.

10. The method according to claim 9, comprising:
determining, at each cycle, whether the time interval reaches or exceeds a predefined maximum time interval, and
if the time interval reaches or exceeds the predefined maximum time interval, sending a warning signal.

11. A windfarm comprising:
one or more wind turbines; and
a computer communicatively coupled to the one or more wind turbines and to a control center, the computer being configured to:
dispatch a notification of an updated data record to the control center,
receive a request for the updated data record from the control center, wherein the request for the updated data record is received from the control center if the control center determines that a particular time interval assigned to the wind turbine or windfarm has elapsed since a last dispatch of a request or a reception of a last reply including a last data record, wherein the control center ignores the notification of the updated data record if the time interval has not yet elapsed since the last dispatch of the request or the reception of the last reply including the last data record, and
send a reply with the updated data record to the control center.

12. A control center, communicatively coupled to a wind turbine or windfarm, the control center being configured to:
receive a notification of an updated data record from the wind turbine or windfarm,
determine whether the updated data record is to be requested, determining whether the updated data record is to be requested includes including determining whether a particular time interval assigned to the wind turbine or windfarm has elapsed since a last dispatch of a request or a reception of a last reply including a last data record,
if the time interval has not yet elapsed, ignoring the notification of the updated data record, and
if the time interval has elapsed:
dispatch a request for the updated data record of the wind turbine or windfarm, and
receive a reply with the updated data record from the wind turbine or windfarm.

13. A system including a plurality of wind turbines and a plurality of windfarms according to claim 11.

14. The method according to claim 2, wherein the time interval is variable.

15. The method according to claim 1, comprising:
manually adjusting a duration of the time interval.

16. The method according to claim 5, wherein the computer is part of a Supervisory Control and Data Acquisition (SCADA) system.

* * * * *